(12) United States Patent
Domyo et al.

(10) Patent No.: US 6,266,421 B1
(45) Date of Patent: Jul. 24, 2001

(54) KEY RECOVERY SYSTEM AND KEY RECOVERY METHOD

(75) Inventors: Seiichi Domyo, Fujisawa; Hiroyoshi Tsuchiya; Seiko Kanno, both of Yokohama; Hiroyuki Ando, Kawasaki; Ichirou Morita, Kawasaki; Yasutsugu Kuroda, Kawasaki; Naoya Torii, Kawasaki; Hiroshi Miyauchi, Tokyo; Kazue Sako, Tokyo; Masashi Yamazaki, Tokyo, all of (JP)

(73) Assignees: Hitachi, LTD, Tokyo (JP); NEC Corporation, Tokyo (JP); Fujitsu Limited, Nakahara-ku (JP)

( * ) Notice: Subject to any disclaimer, the term of this patent is extended or adjusted under 35 U.S.C. 154(b) by 0 days.

(21) Appl. No.: 09/111,281

(22) Filed: Jul. 7, 1998

(30) Foreign Application Priority Data

Jul. 7, 1997 (JP) .................................. 9-181189

(51) Int. Cl.$^7$ ....................................... H04L 9/00
(52) U.S. Cl. ........................................ 380/286; 380/282
(58) Field of Search ................... 380/281, 282, 380/284, 285, 286; 713/169, 171

(56) References Cited

U.S. PATENT DOCUMENTS

| | | | |
|---|---|---|---|
| 5,557,346 | * 9/1996 | Lipner et al. | ........................ 380/286 |
| 5,557,765 | 9/1996 | Lipner. | |
| 5,640,454 | * 6/1997 | Lipner et al. | ........................ 380/286 |
| 5,745,573 | * 4/1998 | Lipner et al. | ........................ 380/286 |
| 5,872,846 | * 2/1999 | Ichikawa | ............................. 380/282 |
| 5,920,630 | * 7/1999 | Wertheimer et al. | ................ 380/286 |
| 5,937,066 | * 8/1999 | Gennaro et al. | ..................... 380/286 |

OTHER PUBLICATIONS

Schneier, Applied Cryptography, 2nd., Ed., p. 51, 1996.*

* cited by examiner

*Primary Examiner*—Tod Swann
*Assistant Examiner*—Steve Kabakoff
(74) *Attorney, Agent, or Firm*—Antonelli, Terry, Stout & Kraus, LLP

(57) ABSTRACT

The present invention has an object to overcome problems of a key recovery system using a conventional KRF system and to achieve efficient operation of the overall key recovery system. A key recovery system of the present invention includes check units 12a, 12b for checking whether a user has a recovery authorization for a common key KS, on the basis of a recovery condition RC specified by a recovery condition index RCI which is added to an encrypted message (encrypted message obtained by encrypting the common key KS with a public key KRCpub) supplied from a terminal (10a to 10d) of the user concerned, and a key recovery control unit 14 which is provided separately from the check units 12a, 12b and decrypts the encrypted message with a private key KRCpri paired with the public key KRCpub to recover the common key. The check unit 12a, 12b supplies the common key KS recovered in the key recovery control unit 14 to the user concerned only when the user has the recovery authorization.

10 Claims, 8 Drawing Sheets

KEY RECOVERY SYSTEM AND KEY RECOVERY METHOD

BACKGROUND OF THE INVENTION

1. Field of the Invention

The present invention relates to a key recovery system in which an encrypted message obtained by encapsulating a data key serving as a data encryption/decryption key with a system key serving as a data encryption key is decrypted by using a master key serving as a data decryption key in accordance with a user's request, thereby decapsulating the data key.

2. Description of Related Art

A data encryption system for encrypting and decrypting data with numerical value data called as a "key" has been known as a technique for ensuring security of data such as secret (confidential) information, etc. With the data encryption system, only a user having a decryption key is able to decrypt an encrypted message.

The data such as secret information, etc. have the following characteristics.

(1) Duty of maintaining secrecy until a predetermined time is imposed under Law, Rule or Agreements. That is, it is required to hold data for a predetermined term (for example, for several years) while keeping the data encrypted.

(2) It is rare to decrypt an encrypted message and use the decrypted message. That is, if data are temporarily encrypted and saved, the data are rarely accessed afterwards.

(3) It must be ensured that data can be decrypted as occasion demands.

In the data encryption system described above, when a decryption key is lost for some reason, it is actually impossible to decrypt encrypted message. For example, when an encrypted message is held in a file or the like and after some days the data are required to be taken out, the data concerned could not be restored to original data if there is no decryption key. This is equivalent to the case where the data are lost. It is an actual possible case that a decryption key is lost. For example, it may be considered that a user erroneously deletes a file in which a decryption key is held, or in a company a person who manages a decryption key is transferred to another office or resigns from the company, so that a place at which a decryption key is held is unknown.

In the present situation, management of a key is usually entrusted to a responsible person for management of secret information. Therefore, it is expected that various problems will occur in management of keys more and more as encryption of secret information more widespread.

Accordingly, there has been proposed a key recovery system which enables accurate decryption of an encrypted message when a decryption key is lost, thereby backing up data such as secret information, etc.

In the following description, a system using a method to attach a tag to an encrypted message, which is called a "KRF (Key Recovery Field) system", will be described as a conventional key recovery system.

FIG. 7 is a schematic diagram showing the construction of a key recovery system to which the conventional KRF system is applied. This system is implemented among plural information processing devices (for example, personal computers) which are connected to one another through a network 54 such as a LAN or the like.

In FIG. 7, terminals 50a to 50c are information processing devices used by users of this system, and each terminal has a function of data encryption/decryption data. This function is implemented through execution of data encryption/decryption program 504b loaded from a magnetic disk 502 onto a memory 504 through a disk controller 506 by a CPU 502. In FIG. 7, reference numeral 504a represents an operating system (OS), and reference numeral 505 represents a network controller for implementing communications through the network 54. Three terminals are illustrated in FIG. 7, but the number of terminals is not limited to any specific value.

When a person who wishes to decrypt an encrypted message loses its decryption key, he/she can recover his/her lost key with the assistance of a key recovery center 52 which is an information processing device having a function of recovering the decryption key concerned. This function is implemented through execution of a key recovery program 524b and a check program 524c loaded from a magnetic disk 522 into a memory 524 through a disk controller 526 by a CPU 523. In FIG. 7, reference numeral 524a represents OS, and reference numeral 525 represents a network controller for implementing communications through the network 54.

In addition to the OS 524a, the key recovery program 524b, the check program 524c, a key recovery condition (RC: Recovery Condition) for judging whether a person who requests recovery of a lost decryption key has authorization to access the decryption key concerned is stored as a data base in the magnetic disk 522.

It is now assumed that the user of each of the terminals 50a to 50c instructs his/her terminal to execute the data encryption/decryption program 504b thereof so that data m such as secret information or the like are encrypted with his/her private key and then saved as data in the magnetic disk 502 in FIG. 7.

According to the KRF system, the structure of the encrypted message is as follows.

| KRF | main body of encrypted message |
|---|---|
| [RCI \| KS]KRCpub | [KS]Userpub \| [m]KS |

Here, KRCpub represents a public key of the key recovery center 52. This public key is in paired relationship with a private key KRCpri of the key recovery center 52. Userpub represents a public key of the user of each terminal, and this is in paired relationship with a private key Userpri of the user concerned. The public key and the private key mean a public key and a private key on the basis of a public key encryption algorithm such as RSA (Rivest, Shamir, Adleman) or the like.

KS represents a common key based on a common key encryption algorithm such as DES (Data Encryption Standard) or the like. RCI represents a recovery condition of a person who can recover a key, that is, a recovery condition index for specifying RC. As described above, the key recovery center 52 has a data base of RC stored in the magnetic disc 522, and RCI is used when RC is searched from the data base.

Further, [a]b represents an encrypted message obtained by encrypting data a by using a key b. For example, [m]KS represents an encrypted message obtained by encrypting data m with a common key KS, and "|" means data coupling.

As described above, according to the KRF system, an encrypted message has a structure of addition of the main body of encrypted message ([KS]Userpub|[m]KS) with the data ([RCI|KS]KRCpub) as KRF.

When a user wishes to decrypt an encrypted message [RCI|KS]KRCpub|[KS]Userpub|[m]KS to obtain the data m, the processing is usually carried out according to the following procedure by the data encryption/decryption program 504b.

(1) The common key KS is obtained by decrypting [KS]Userpub with the private key Userpri held by the user.

(2) The data m are obtained by decrypting [m]KS with the obtained common key KS.

The process of decrypting the encrypted message according to the above procedure is hereinafter referred to as "normal recovery".

On the other hand, when the user of the terminal cannot decrypt the encrypted message according to the procedure of the normal recovery because the private key Userpri is lost or the like, the encrypted message is decrypted by using the common key KS which is obtained in the key management center 52. This process is hereinafter referred to as "urgent recovery" as opposed to the usual recovery.

The processing flow of the urgent recovery will be described with reference to FIG. 8. FIG. 8 is a diagram showing the data flow of the urgent recovery of a key recovery system using the conventional KRF system.

(1) First, the terminal of the user transmits KRF([RCI|KS] KRCpub) added to the main body of the encrypted message through the network 54 to the key recovery center 52.

(2) Upon receiving KRF, the key recovery center 52 executes the key recovery program 524 to decrypt KRF with the private key KRCpri held therein, whereby the recovery condition index (RCI) and the common key KS are obtained.

(3) Subsequently, the key recovery center 52 executes the check program 524c to search for the key recovery condition RC (the key recovery condition RC1 in the case of FIG. 8) specified by the recovery condition index RCI (recovery condition index RCI1 in the case of FIG. 8) obtained in the above (2) from the data base 527 stored in the magnetic disc 522. Whether the user satisfies the key recovery condition (for example, name, belonging, password, etc.) searched, that is, whether the user has key recovery authorization is interactively checked between the key recovery center 52 and the terminal of the user through the network 54.

(4) Subsequently, if the key recovery center 52 confirms that the user has key recovery authorization, it transmits the common key KS obtained in (2) through the network 54 to the terminal of the user concerned. On the other hand, if it is not confirmed that the user has key recovery authorization, the key recovery center 52 does not transmit the common key KS obtained in (2) to the terminal of the user concerned.

(5) Upon receiving the common key KS, the terminal of the user executes the data encryption/decryption program 504b to decrypt the encrypted message [m]KS stored in the magnetic disc 502 with the common key KS, thereby obtaining the data m.

A commercial Key Escrow of Lipner, et al. is known as a publicly-known example of the key recovery system using the KRF system as described above, and it is disclosed in U.S. Pat. No. 5,557,765.

SUMMARY OF THE INVENTION

The above-described key recovery system using the conventional KRF system has the problem that the entity of the system cannot be efficiently placed in operation. Specifically, the above-described key recovery system has the following problems.

(1) In the key recovery system using the conventional KRF system, the key recovery program 524b for recovering a key and the check program 524c for checking the recovery authorization of a key are executed in the same information processing device (key recovery center 52). That is, the key recovery processing and the authorization check processing in the urgent recovery are concentrated in the key recovery center 52. Therefore, the key recovery center is required to manage the private keys KRCpri of the key recovery center concerned so that injustice is not made.

Particularly when a key recovery center is disposed in each of plural domains (a network which is constructed on a department basis or business place basis is set as a domain), the private keys KRCpri which are held by a key recovery center concerned must be managed for every key recovery center in the above-described conventional technique. Accordingly, a large load is imposed on the key management, and the efficient operation of the overall system cannot be achieved. This problem is more significant as the number of domains containing a key recovery center is increased.

(2) In the key recovery system using the conventional KRF system, the key recovery condition index RCI and the common key KS are obtained by decrypting the KRF supplied from a user with the private key KRCpri, and it is then checked according to the key recovery condition specified by the recovery condition index RCI as to whether the user concerned has authorization to recover the common key KS. That is, the common key KS is obtained before it is checked whether the user concerned has the authorization to recover the common key KS. Therefore, it is necessary to hold the common key KS so as to prevent leakage of the common key KS until the check of the recovery authorization of the common key KS is completed. Accordingly, the load on the key management is large and thus the efficient operation of the overall system cannot be achieved.

(3) In the key recovery system using the conventional KRF system, in the case where a key recovery center is disposed in each of plural domains, for example when a terminal of a user belonging to a domain is moved to another domain, a common key KS for data encrypting/decrypting which is created in a domain before the movement cannot be recovered in the key recovery center disposed in the domain after the movement if the format of the key recovery condition is not made common. That is, in order to recover the common key KS for data encrypting/decrypting created in the domain before the movement, a request for the urgent recovery processing must be made to the key recovery center disposed in the domain before the movement, and this obstructs the efficient operation of the overall system.

The present invention has been implemented in view of the foregoing situation, and the present invention has an object to overcome the problems of the key recovery system using the conventional KRF system and enable the efficient operation of the overall key recovery system.

Specifically, an object of the present invention is to achieve the efficient operation of the overall key recovery system by reducing the load imposed on management of a recovery key used for urgent recovery.

Further, another object of the present invention is to reduce the load imposed on management of a key by recovering the key after recovery authorization of the key is checked, thereby achieving the efficient operation of the overall key recovery system.

Further, a yet another object of the present invention is to enable a domain to check key recovery authorization even under a key recovery condition set by the format of another domain among plural domains to which the format of the key recovery condition is not made common, thereby achieving the efficient operation of the overall key recovery system.

In order to attain the above objects, according to a first aspect of the present invention, a key recovery system in which an encrypted message obtained by encrypting a data key serving as a data encryption/decryption key with a system key serving as a data encryption key is decrypted by using a master key serving as a data decryption key in accordance with a user's request, thereby recovering the data key, said recovery system comprising:

at least one authorization check unit for checking whether a user has authorization to recover the data key, on the basis of a recovery condition specified by a key recovery field concerning a recovery condition of the data key which is added to the encrypted message supplied from the user, and a key recovery control unit which is provided separately from the authorization check unit and recovers the data key by decrypting the encrypted message with the master key, wherein the authorization check unit supplies the data key recovered by the key recovery control unit only when it is judged that the user has the recovery authorization.

Here, a common key based on a common key encryption algorithm such as DES or the like is used as the data key, for example. Further, as the system key and the master key, a public key based on a public key and a private key encryption algorithm such as RSA or the like, or the common key, are used.

According to the first aspect of the present invention, a key recovery control unit for recovering a data key and a check unit for checking recovery authorization of the data key are separately and independently provided. That is, the key recovery processing and the authorization check processing in urgent recovery are dispersed to the key recovery control unit and the check unit, respectively. Therefore, the management of the master key used to recover the data key may only be performed by the key recovery control unit. Particularly, when a check unit is mounted in each of plural domains (for example, a network which is constructed on a department basis, a business-place basis or the like is set as one domain), it is sufficient to mount only one key recovery control unit for all domains, and thus the load imposed on the key management system can be reduced, thereby achieving efficient operation of the overall system.

According to a second aspect of the present invention, a key recovery control unit in which an encrypted message obtained by encrypting a data key serving as a data encryption/decryption key with a system key serving as a data encryption key is decrypted by using a master key serving as a data decryption key in accordance with a user's request, thereby recovering the data key, said key recovery system comprising:

acquisition means for acquiring, from a user, a first encrypted message obtained by encrypting a first data key with a first system key, and a second encrypted message obtained by encrypting the second data key with a second system key, which are added with data obtained by encrypting a key recovery field concerning a recovery condition of the first data key with the second data key;

first key recovery means for decrypting the second encrypted message acquired in the acquisition means by a master key which is paired with the second system key, thereby recovering the second data key, and decrypting the data added to the second encrypted message by using the second data key, thereby recovering the key recovery field;

first authorization check means for checking, according to a recovery condition specified by the key recovery field recovered by the first key recovery means, whether the user supplying the first encrypted message and the second encrypted message has authorization to recover the first data key; and second key recovery means for decrypting the first encrypted message acquired in the acquisition means by using a maser key paired with the first system key if it is judged in the first authorization check means that the user has recovery authorization, thereby recovering the first data key.

Here, the first data key is a key used to encrypt data such as secret (confidential) information or the like. Further, the second data key is a one-time key used to decrypt the first data key.

According to the second aspect of the present invention, the first data key is recovered in the second key recovering means only when it is judged in the first authorization check means that the user has authorization to recover the first data key. Accordingly, unlike the key recovery system using the conventional KRF system, it is unnecessary to hold the first data key with the first data key being recovered from the time when the first data key is recovered until the time when the check of the recovery authorization of the first data key is completed. Therefore, the load imposed on the key management system can be reduced, and thus the efficient operation of the key recovery system can be achieved.

The key recovery control unit according to the second aspect of the present invention may be further provided with a storage device for storing at least one index (identifier) representing that the user has the recovery authorization, and the recovery condition which is corresponding to the index, and the key recovery field is set as the index, wherein the first authorization check means is controlled to search the index recovered in the first key recovering means from the storage device to obtain the recovery condition corresponding to the index concerned, and judge according to the recovery condition whether the user supplying the first encrypted message and the second encrypted message has the authorization to recover the first data key.

In this case, when the recovery condition corresponding to the index which is recovered by the first key recovery means is not stored in the storage device, the first authorization check unit may confirm whether the index itself is stored in the storage device, and judges on the confirmation that the user supplying the first encrypted message and the second encrypted message has the authorization to recover the first data key.

Further, when information representing that the confirmation of the recovery condition is unnecessary is attached to the index recovered by the first key recovering means, the first authorization check unit may confirm whether the recovery condition index itself is stored in the storage device and judge on the basis of the confirmation that the user supplying the first encrypted message and the second encrypted message has the authorization to recover the first data key.

With this design, in the case where a key recovery control unit is mounted in each of plural domains to which the format of the recovery condition is not made common, with respect to a key recovery condition which is set according to the format of another domain, each key recovery control may be set to store only the index thereof into the storage device, thereby enabling the check of the recovery authorization.

DETAILED DESCRIPTION OF THE PREFERRED EMBODIMENTS

Preferred embodiments according to the present invention will be described hereunder with reference to the accompanying drawings.

Figure 1:
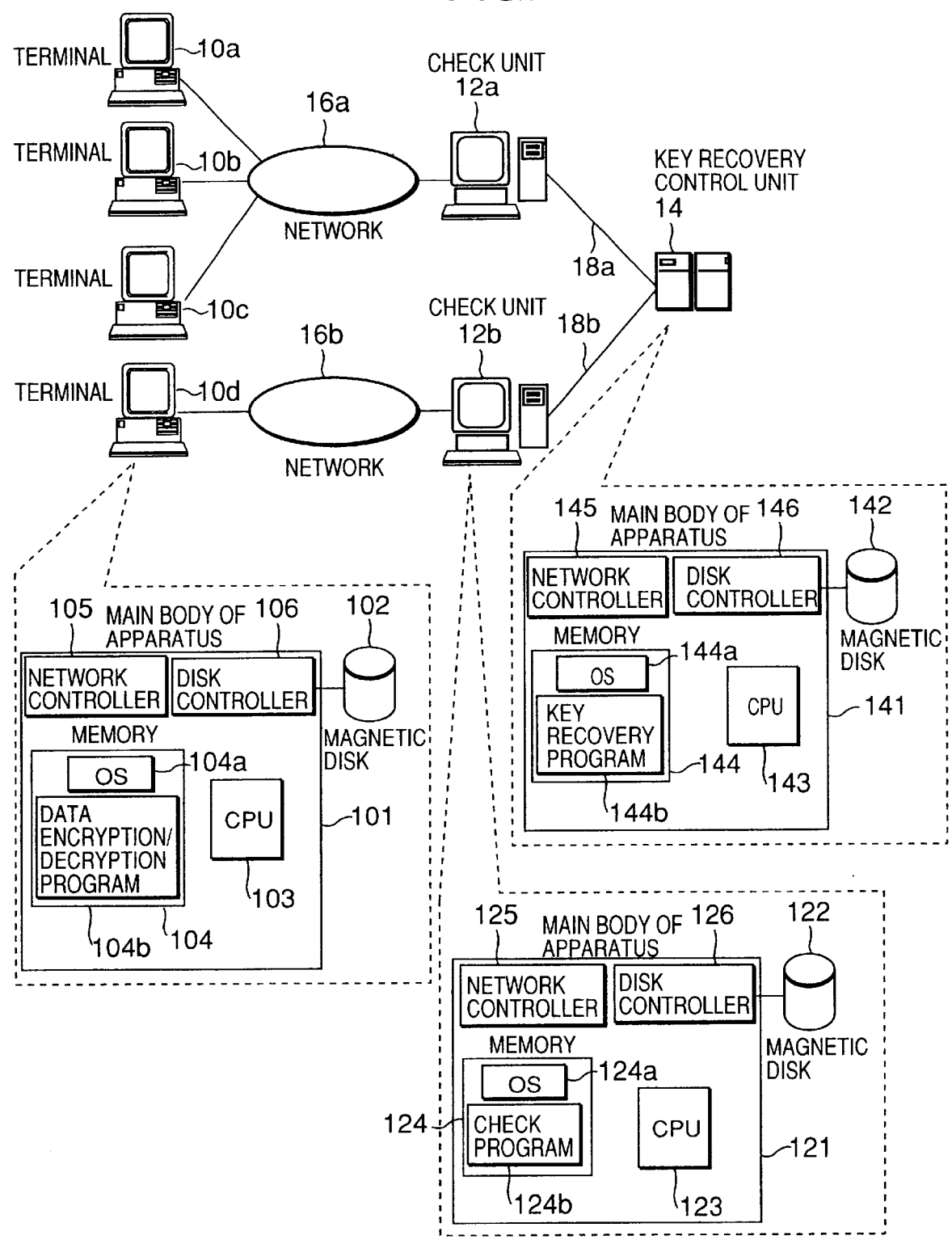
FIG. 1 is a schematic diagram showing the construction of a key recovery system according to a first embodiment of the present invention.

FIG. 1 is a diagram showing a key recovery system according to a first embodiment of the present invention.

As shown in FIG. 1, the key recovery system of the first embodiment comprises plural terminals 10a to 10d connected to networks 16a and 16b such as LANs or the like, check units 12a and 12b which are connected to the networks 16a and 16b respectively, and a key recovery control unit 14 which is connected to the check units 12a and 12b through special-purpose lines 18a and 18b.

In this case, the terminals 10a to 10c are connected to the network 16a, and the terminal 10d is connected to the network 16b. However, the number of terminals to be connected to each network is not limited to a specific value. Further, the number of networks is not limited to a specific value shown in FIG. 1. In addition, the number of check units is not limited to a specific value shown in FIG. 1, and at least one check unit may be connected to a terminal through a network such as LAN, Internet or the like.

In FIG. 1, each of the terminals 10a to 10d is an information processing device used by a user of this system, and it has a function of performing data encryption/decryption. This function is implemented through execution of a data encryption/decryption program 104b loaded from a magnetic disk 102 onto a memory 104 through a disc controller 106 by a CPU 102. In FIG. 1, reference numeral 104a represents an operating system (OS), and reference numeral 105 represents a network controller which implements communications through the network 16a or the network 16b.

When a person who wishes to decrypt data loses a decryption key for the data concerned, each of the check units 12a and 12b serves as an information processing device having a function of checking whether the person has authorization to recover the lost decryption key. This function is implemented through execution of a check program 124b loaded from a magnetic disc 122 onto a memory 124 through a disk controller 126 by a CPU 123. In FIG. 1, reference numeral 124a represents OS, and reference numeral 125 represents a network controller for implementing communications through the network 16a or the network 16b, and communications through the special-purpose line 18a or 18b.

In addition to the OS 124a and the check program 124b, a key recovery condition (RC: Recovery Condition) for judging whether a person requesting recovery of a decryption key has authorization to recover the decryption key concerned is stored in the form of a data base in the magnetic disc 122.

In this embodiment, it is assumed that the check unit 12a checks the key recovery authorization for the users of the terminals 10a to 10c, and the check unit 12b checks the key recovery authorization for the user of the terminal 10d.

When a person who wishes to decrypt data loses a decryption key for the data, the key recovery control unit 14 serves as an information processing device having a function of recovering the decryption key. This function is implemented through execution of a key recovery program 144b loaded from a magnetic disk 142 into a memory 144 through a disk controller 146 by a CPU 143. In FIG. 1, reference numeral 144a represents OS, and reference numeral 145 represents a network controller for implementing communications through the special-purpose line 18a or the special-purpose line 18b.

Next, the operation of the system of this embodiment will be described.

First, the processing when each of the terminals 10a to 10d encrypts data m such as secret information or the like will be described.

This operation is basically the same as the key recovery system using the conventional KRF system. That is, when the data encryption/decryption program 104a is executed in each of the terminals 10a to 10d, the data m is encrypted with a common key KS to be converted to data [m]KS. Further, the common key KS is encrypted with a public key Userpub of the user of the terminal to be converted to data [KS]Userpub. The data [m]KS and the data [KS]Userpub are set as an encrypted message body ([KS]Userpub|[m]KS).

Further, the common key KS is encrypted with a public key KRCpub of the key recovery control unit 14 to be converted to data [KS]KRCpub. A recovery condition index RCI for specifying a recovery condition RC of the common key KS is encrypted with the common key KS to be converted to data [RCI]KS. The data [KS]KRCpub and the data [RCI]KS are set as KRF([RCI]KS|[KS]KRCpub) to be added to the encrypted message body. Accordingly the structure of the overall encrypted message is as follows:

| KRF | encrypted message body |
|---|---|
| [RCI]KS | [KS]KRCpub | [KS]Userpub | [m]KS |

It is unnecessary to generate KRF and the encrypted message body at the same time.

Next, the processing when the user of each of the terminals 10a to 10d wishes to decrypt the encrypted message having the above data structure [RCI]KS|[KS]KRCpub|[KS]Userpub|[m]KS which is stored in the magnetic disk 102, thereby obtaining the data m, will be described.

First, the process procedure in normal recovery will be described. In this case, the terminal performs the decrypting processing of the data m alone.

Each of the terminals 10a and 10b executes the data encryption/decryption program 104b so as to decrypt [KS]Userpub with a private key Userpri paired with a public key Userpub of the user, to obtain the common key KS, and to decrypt [m]KS with the common key KS obtained to obtain data m.

Next, the process procedure in the urgent recovery will be described with reference to FIGS. 2 and 3.

Figure 2:
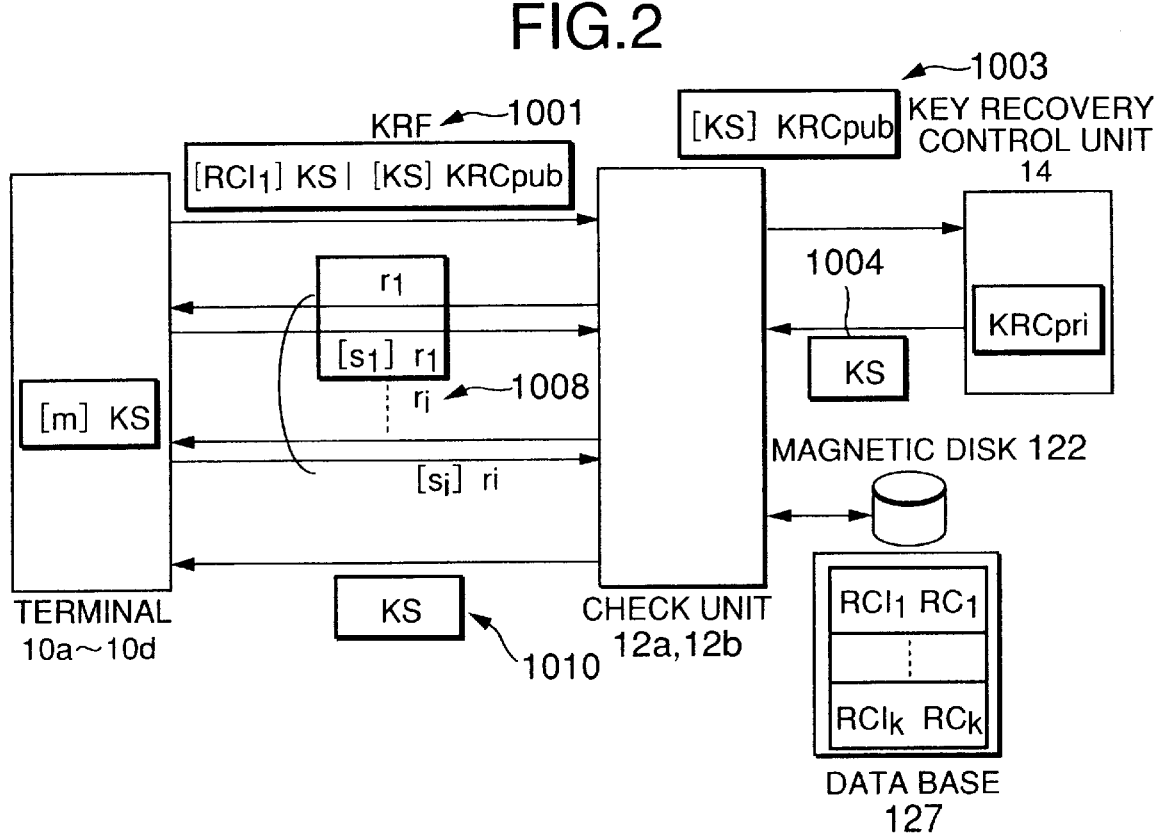
FIG. 2 is a diagram showing data flow in urgent recovery of the key recovery system according to the first embodiment of the present invention.
Figure 3:
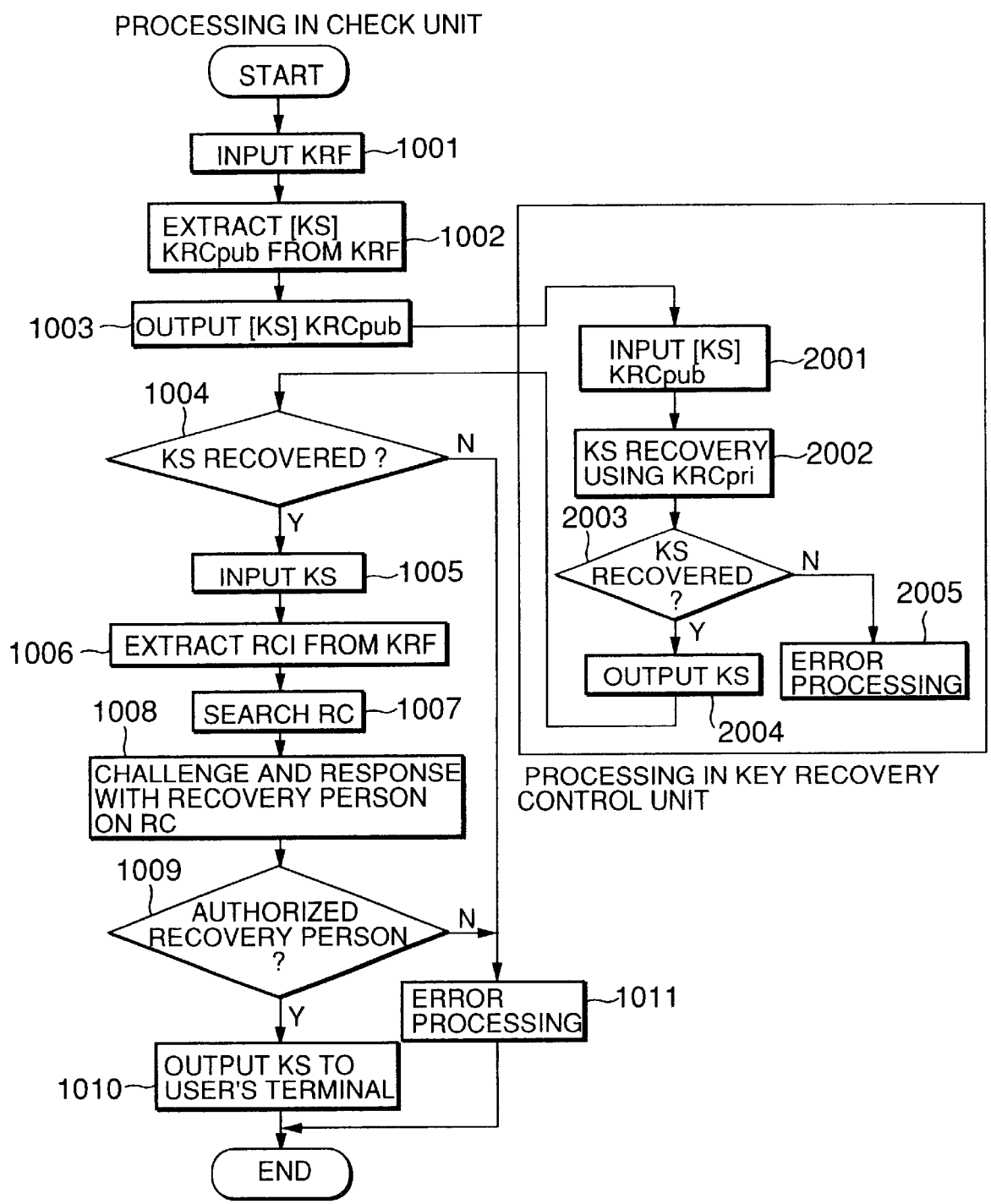
FIG. 3 is a diagram showing the process procedure in the urgent recovery of the key recovery system according to the first embodiment of the present invention.

FIG. 2 is a diagram showing the data flow in the urgent recovery of the key recovery system according to the first embodiment of the present invention, and FIG. 3 is a diagram showing the process procedure in the urgent recovery of the key recovery system according to the first embodiment of the present invention.

In the urgent recovery, the terminal, the check unit and the key recovery control unit decrypt the encrypted message in cooperation with one another.

First, each of the terminals 10a to 10d of the users transmits KRF([RCI]KS|[KS]KRCpub) added to the encrypted message body through the network 16a, 16b to the check unit 12a, 12b. Specifically, in the case of the terminals 10a to 10c, KRF is transmitted to the check unit 12a through the network 16a. In the case of the terminal 10d, KRF is transmitted through the network 16b to the check unit 12b.

Upon receiving KRF (step 1001), the check unit 12a, 12b executes the check program 124b to carry out the processing of steps 1002 to 1011. First, the data [KS]KRCpub are extracted from KRF thus received (step 1002). The extraction method thereof is dependent on the data format of KRF or an encryption algorithm being used. For example, the extraction can be implemented by extracting data of a predetermined bit length from a predetermined area in consideration of the characteristic that when the bit length of the common key KS is set to 64 bits and the bit length of the public key KRCpub is set to 1024 bits, the bit length of the data obtained by encrypting the common key KS with the public key KRCpub is equal to 1024 bits.

Subsequently, the check unit 12a, 12b transmits the extracted data [KS]KRCpub to the key recovery control unit 14 through the special-purpose line (the special-purpose line 18a for the check unit 12a or the special-purpose line 18b for the check unit 12b ) (step 1003). Thereafter, the common key KS is recovered in the key recovery control unit 14, and the check unit 12a, 12b waits until the common key KS thus recovered is transmitted thereto (step 1004).

Upon receiving the data [KS]KRCpub (step 2001), the key recovery control unit 14 executes the key recovery program 144b to carry out the processing of steps 2002 to 2005. First, the key recovery control unit 14 decrypt [KS] KRCpub received with the private key KRCpri provided therein (having the paired relationship with the public key KRCpub), thereby recovering the common key KS (step 2002).

Subsequently, if the recovery of the common key KS can be confirmed on the basis of the type of encryption algorithm or attribute information on the generation date or usage date of the common key KS (step 2003), the key recovery control unit 14 transmits the common key KS recovered to the check unit 12a, 12b to which the data [KS]KRCpub are transmitted in the step 1003 (step 2004). On the other hand, if the recovery of the common key KS cannot be confirmed, this fact is transmitted to the check unit 12a, 12b to which the data [KS]KRCpub are transmitted in the step 1003, thereby performing error processing (step 2005).

Upon receiving the common key KS from the key recovery control unit 14 (step 1005), the check unit 12a, 12b extracts the data [RCI]KS from KRF received in the step 1001. Thereafter, the check unit 12a, 12b decrypts the data [RCI]KS with the common key KS to obtain the index RCI of the recovery condition (step 1006). Thereafter, the recovery condition RC (the recovery condition RC1 in FIG. 2) corresponding to the obtained index RCI (the index RCI1 in FIG. 2) is searched from the data base 127 stored in the magnetic disk 122 (step 1007).

Subsequently, the check unit 12a, 12b checks whether the user of each terminal (10a to 10d) which transmits KRF satisfies the recovery condition RC thus searched (password, employee identification number, the date of birth, telephone number, etc.), that is, whether the user has authorization to recover the key (step 1008). Specifically, a challenge and response (question and answer) on the recovery condition RC is performed at least once between the check unit and the terminal of the user. For example, the check unit transmits a question and a random number ri to the user's terminal. Upon receiving the question and the random number ri, the user's terminal encrypts a response si to the question with the random number ri ([si]ri) and then returns back the encrypted response to the check unit. The check unit decrypts the encrypted response [si]ri to obtain the response si and judges whether this response si satisfies the recovery condition RC.

Subsequently, upon confirming that the user has the key recovery authorization (step 1009), the check unit 12a, 12b transmits the common key KS received from the key recovery control unit 14 in step 1005 to the terminal of the user concerned (step 1010). On the other hand, if it is not confirmed that the user has key recovery authorization, it transmits an error message or the like to the terminal of the user concerned (step 1011).

When an abnormality such as time-out or the like occurs in step 1004, the check unit 12a, 12b transmits an error message or the like to the terminal 10a to 10d (the terminals 10a to 10c in the case of the check unit 12a, the terminal 10d in the case of the check unit 12b) which transmits KRF in step 1001 (step 1011).

Upon receiving the common key KS, the terminal (10a to 10d ) executes the data encryption/decryption program 104b to decrypt [m]KS with the common key KS thereby obtaining the data m.

In the first embodiment of the present invention, the key recovery control unit 14 for recovering the common key KS and the check units 12a, 12b for checking the recovery authorization of the common key KS are separately and independently provided. That is, the key recovery processing and the authorization check processing in the urgent recovery are dispersed to the key recovery control unit 14 and the check units 12a, 12b. Therefore, the management of the private key KRCpri used to recover the common key KS can be carried out by only the key recovery control unit 14.

Accordingly, particularly when the check unit is provided in each of plural domains (for example, a network which is constructed on a department basis or on a business-place basis is set as a domain), only one key recovery unit may be disposed for all domains. Therefore, the load on the key management can be reduced, and thus the efficient operation of the overall system can be achieved.

In the first embodiment, the common key KS based on the common key encryption algorithm such as DES or the like is used as the data key to encrypt the data m, and the public key KRCpub and the private key KRCpri based on the public key encryption algorithm such as RSA or the like are used as the system key and the master key to encrypt and decrypt the data key. However, the present invention is not limited to the above mode, and a common key based on the common key encryption algorithm such as DES or the like may be used as the system key and the master key.

The first embodiment according to the present invention has been described above.

Next, a second embodiment according to the present invention will be described.

The difference of the key recovery system of this embodiment from the key recovery system of the first embodiment shown in FIG. 1 resides in that a data encryption/decryption program 104c is used in place of the data encryption/decryption program 104b executed in the terminals 10a to 10d, that a check program 124c is used in place of the check program 124b executed in the check units 12a, 12b, and that a key recovery program 144c is used in place of the key recovery program 144b executed in the key recovery control unit 14. The construction of the overall key recovery system of this embodiment is the same as the first embodiment shown in FIG. 1, and its illustration is omitted from the drawings.

Next, the operation of the system of this embodiment will be described.

First, the processing when the terminals 10a to 10d encrypt the data m such as secrete information or the like will be described.

When the data encryption/decryption program 104c is executed in the terminals 10a to 10d, the data m is encrypted with a common key KS to be converted to data [m]KS. The common KS is encrypted with a public key Userpub to be converted to data [KS]Userpub. The data [m]KS and the data [KS]Userpub are set as encrypted message body ([KS]Userpub|[m]KS).

Further, the common key KS is encrypted with a public key KRCpub of the key recovery control unit 14 to be converted to data [KS]KRCpub. A recovery condition index RCI for specifying the recovery condition RC of the common key KS is encrypted with the common key KS to be converted to data [RCI]KS. The data [KS]KRCpub and the data [RCI]KS are set as first KRF1 ([RCI]KS|[KS]KRCpub).

In addition, each of the terminals 10a to 10d generates a one-time random number r, and encrypts it with a public key KRC2pub of the check unit 12a, 12b (the public key of the check unit 12a for the terminals 10a to 10c, the public key of the check unit 12b for the terminal 10d) to generate data [r]KRC2pub. Data s1 to sj necessary to satisfy the recovery condition RC of the common key KS and a recovery condition index RCI to specify the recovery condition RC of the common key KS are encrypted with the random number r to generate data [RCI|s1| ... si]r. The data [r]KRC2pub and the data [RCI|s1| ... si]r are set as second KRF2 ([RCI|s1| ... si]r|[KS]KRC2pub) to be added to the encrypted message body. The data s1 to sj necessary to satisfy the recovery condition RC of the common key KS correspond to a response si(i=1 ... j) in the challenge and response which is carried out to check the recovery authorization.

As a result of the above processing, the structure of the overall encrypted message is as follows.

si]r|[KS]KRC2pub|[KS]Userpub|[m]KS) which are stored in the magnetic disc 102, will be described.

The processing procedure in the normal recovery is the same as the first embodiment of the present invention. Accordingly, the detailed description of the processing procedure in the normal recovery is omitted, and only the processing procedure in the urgent recovery will be described with reference to FIGS. 4 and 5.

Figure 4:
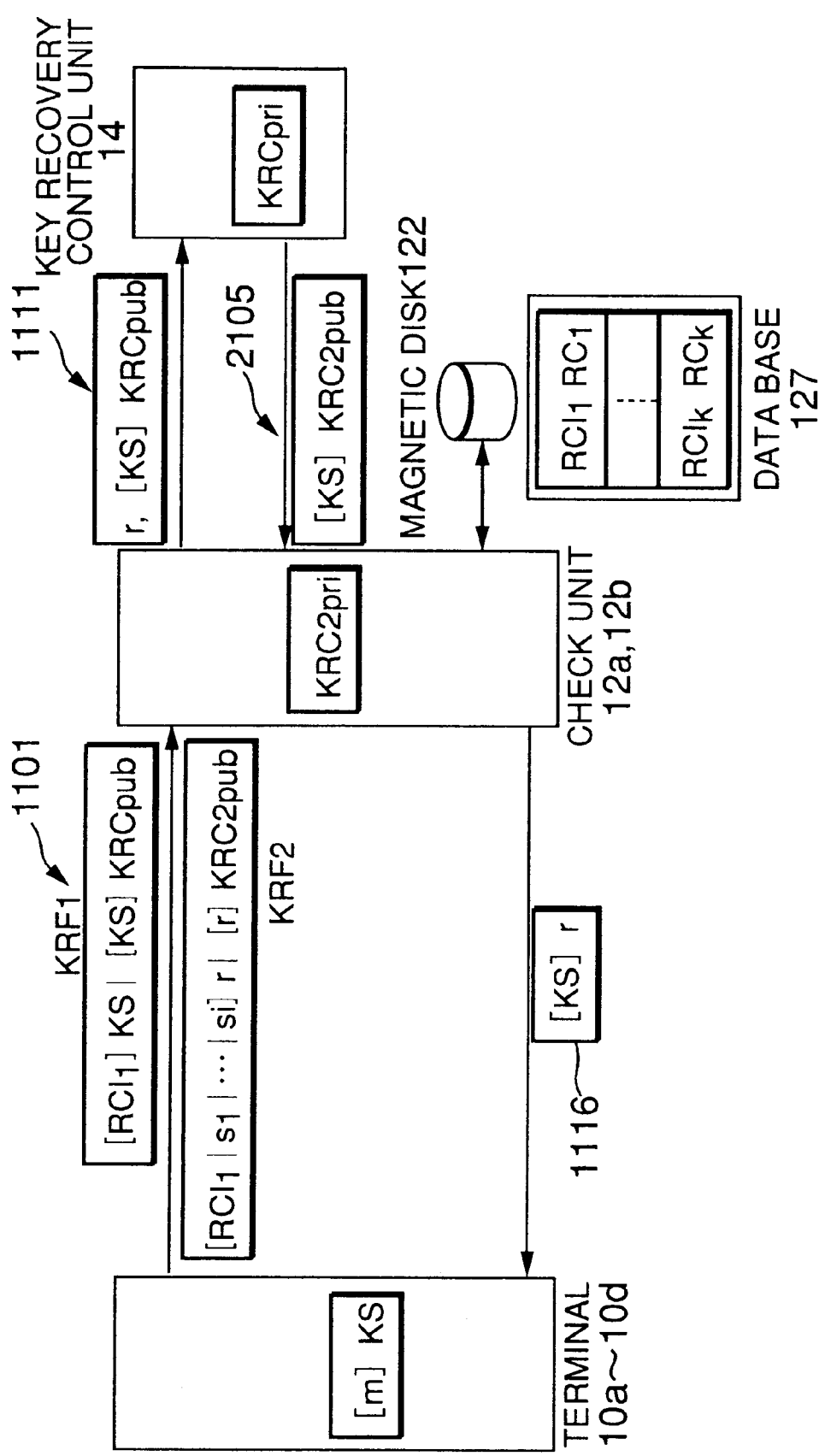
FIG. 4 is a diagram showing the data flow in the urgent recovery of a key recovery system according to a second embodiment of the present invention.
Figure 5:
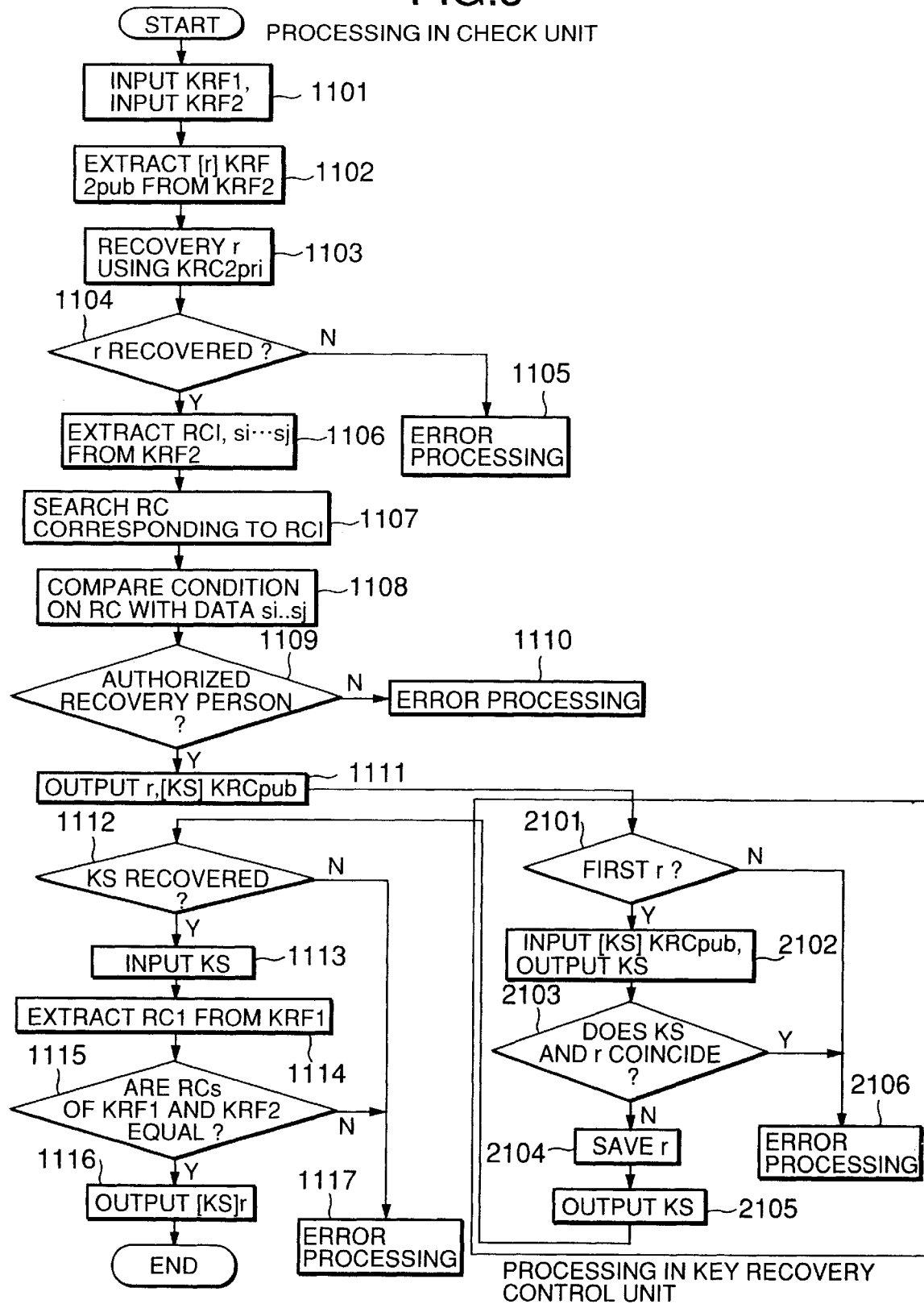
FIG. 5 is a diagram showing the processing procedure in the urgent recovery of the key recovery system according to the second embodiment of the present invention.

FIG. 4 is a diagram showing the data flow in the urgent recovery of the key recovery system of the second embodiment of the present invention, and FIG. 5 is a diagram showing the processing procedure in the urgent recovery of the key recovery system according to the second embodiment of the present invention.

In the urgent recovery, the terminal, the check unit and the key recovery control unit decrypt the encrypted message in cooperation with one another.

Each of the terminals 10a to 10d of the users transmits KRF1 ([RCI]KS|[KS]KRCpub) and KRF2([RCI|S1| ... si]r|[r]KRC2pub) added to the encrypted message body through the network 16a, 16b to the check unit 12a, 12b. Specifically, in the case of the terminals 10a to 10c, KRF1, 2 is transmitted to the check unit 12a through the network 16a. In the case of the terminal 10d, KRF1,2 is transmitted through the network 16b to the check unit 12b.

Upon receiving the KRF1, 2 (step 1101), the check unit 12a, 12b executes the check program 124c to carry out the processing of steps 1102 to 1117. First, data [r]KRC2pub is extracted from the KRF 2 thus received (step 1102).

Subsequently, the check unit 12a, 12b decrypts the extracted data [r]KRC2pub with its private key KRC2pri (having the paired relationship with the public key KRC2pub) operate on, thereby recovering the random number r (step 1103). If the recovery of the random number r cannot be confirmed (step 1104), an error message or the like is transmitted to the terminal which transmits KRF1, 2 (step 1105).

On the other hand, if the recovery of the random number r can be confirmed (step 1104), the check unit 12a, 12b extracts data [RCI|s1| ... si]r from the KRF2 thus received, and decrypts the data with the random number r to obtain the recovery condition index RCI of the recovery condition RC and the data s1 to si which are necessary to satisfy the recovery condition RC (step 1106).

Subsequently, the check unit 12a, 12b searches for the recovery condition RC (the recovery condition RC1 in the case of FIG. 4) corresponding to the recovery condition index RCI (the recovery condition index RCI1 in the case of FIG. 4) of the recovery condition recovered in step 1106 from the data base 127 stored in the magnetic disk 122 (step 1107). Thereafter, it is judged whether the data s1 to si recovered in the step 1106 satisfy the recovery condition RC searched (step 1108), whereby it is temporarily judged whether the user has key recovery authorization (step 1109).

| KRF 1 | KRF2 | encrypted message body |
|---|---|---|
| [RCI]KS \| [KS]KRCpub | [RCI \| s1 \| ... si]r \| [KS]KRC2pub | [KS]Userpub \| [m]KS |

It is unnecessary to generate KRF1, KRF2 and the encrypted message body at the same. In this embodiment, KRF2 is generated when the urgent recovery is carried out.

Next, the processing when the user of each of the terminals 10a to 10d decrypts the encrypted message having the above data structure ([RCI]KS|[KS]KRCpub|[RCI|s1| ...

If it cannot be confirmed that the user has key recovery authorization, an error message or the like is transmitted to the terminal of the user concerned (step 1110).

On the other hand, if it is confirmed that the user has key recovery authorization, the data [KS]KRCpub are extracted from KRF1 thus received. The data [KS]KRCpub extracted are transmitted to the key recovery control unit 14 together with the random number r recovered in step 1103 (step 1111). Thereafter, the common key KS is recovered in the key recovery control unit 14, and the check unit 12a, 12b is on standby until the common key KS thus recovered is transmitted thereto (step 1112).

Upon receiving the data [KS]KRCpub, the key recovery control unit 14 executes the key recovery program 144b to carry out the processing of steps 2101 to 2106. First, it is checked whether the random number r received is registered in a log management table of the magnetic disc 142 (step 2101).

Since the probability of the same random number being generated is very small, if data added with the same random number are transmitted to the key recovery control unit 14 twice or more, it may be considered that there is some injustice (the data has been interfered with). Here, when the random number r received is not registered in the log management table of the magnetic disc 142, the data [KS] KRCpub transmitted together with the random number r may be considered as being obtained as a consequence of the fact that KRF1, 2 transmitted from the terminal of a user requesting the recovery of the common key KS is duly processed. On the other hand, when the random number r is registered in the log management table, the data may be considered as being obtained as a consequence of the fact that the data are transmitted to the check unit 12a, 12b from a third party who intercepts KRF1, 2 transmitted from the terminal of a user requesting the recovery of the common key KS. This is because it is considered that KRF1, 2 transmitted from the third party concerned does not reach the check unit 12a, 12b before KRF1, 2 transmitted from the terminal of the user requesting the recovery of the common key KS reaches the check unit 12a, 12b.

When the random number r received is registered in the log management table, error processing is carried out (for example, an error is notified to a system manager (step 2106). When it is not registered, [KS]KRCpub received is decrypted with the private key KRCpri (having the paired relationship with the public key KRCpub) provided therein to recover the common key KS (step 2102). Thereafter, it is confirmed that the common key KS recovered and the random number r are not coincident with each other (step 2103), and the random number r received is added to the log management table in the magnetic disc 142 (step 2104). If the common key KS and the random number r are coincident with each other, the error processing is carried out (for example, an error is notified to the system manager) (step 2106).

The key recovery control unit 14 encrypts the common key KS recovered in step 2102 with the public key KRC2pub of the check unit 12a, 12b (in step 1111, the public key of the check unit 12a when the transmission side of the random number k and the data [KS]KRCpub is the check unit 12a, the public key of the check unit 12b when it is the check unit 12b) to generate data [KS]KRC2pub. The data is transmitted to the check unit 12a, 12b (the check unit serving as the transmission side of the random number k and the data [KS]KRCpub in step 1111) (step 2105). As described above, by encrypting the common key KS recovered and then transmitting it to the check unit, the security can be kept even when Internet is used for data transmission between the key recovery control unit and the check unit in place of the special-purpose line.

Upon receiving the data [KS]KRC2pub from the key recovery control unit 14 (step 1113), the check unit 12a, 12b decrypts the data with its private key KRC2pri (having the paired relationship with KRC2pub) to recover the common key KS. Subsequently, the data [RCI]KS are extracted from KRF1 received in step 1101, and the data [RCI]KS is decrypted with the common key KS to obtain the recovery condition index RCI (step 1114). It is re-checked whether the obtained recovery condition index RCI and the recovery condition index RCI obtained in step 1106 are coincident with each other, that is, whether the person who is judged to have the recovery authorization in step 1109 has a justified recovery authorization on the common key KS recovered in step 2102 (step 1115), and then the common key KS is encrypted with the random number r and transmitted to the terminal 10a to 10d (the terminals 10a to 10c in the case of the check unit 12a, the terminal 10d in the case of the check unit 12b) which transmits KRF1, KRF2 in step 1101 (step 1116).

As described above, the common key KS is encrypted with the random number r generated at the terminal of the user who requests the recovery of the common key KS, and transmitted to the terminal concerned, whereby the security in the data transmission between the check unit and the terminal can be enhanced. Further, the terminal can check whether the common key KS received is transmitted from the check unit.

When abnormality such as time-out or the like occurs in step 1112 or when the recovery condition index RCI obtained in step 1114 and the recovery condition index RCI obtained in step 1106 are not coincident with each other, the check unit 12a, 12b perform the error processing, for example, transmitting this fact to the terminal (10a to 10d) transmitting KRF1, KRF2 (the terminals 10a to 10c for the check unit 12a, the terminal 10d for the check unit 12b) (step 1117).

Upon receiving the data [KS]r, each of the terminals 10a to 10d executes the data encryption/decryption program 104b to decrypt the data with the random number r to obtain the common key KS. Thereafter, it decrypts the data [m]KS with the common key KS to obtain the data m.

According to the second embodiment of the present invention, in the check unit 12a, 12b, it is checked on the basis of KRF 2 received whether the user has recovery authorization for the common key KS. Only when it is confirmed that the user has the recovery authorization, is the recovery of the common key KS carried out in the key recovery control unit 14. Accordingly, unlike the key recovery system using the conventional KRF system, it is unnecessary to hold the common key KS with the common key KS being recovered from the time when the common key KS is recovered until the time when the check of the recovery authorization of the common key KS is completed. Therefore, the load on the key management can be reduced, and thus the efficient operation of the system can be achieved.

Further, according to the second embodiment of the present invention, in the key recovery control unit 14, after the recovery of the common key KS, it is judged in the check unit 12a, 12b whether the indexes RCI for the recovery condition which are contained in KRF1 and KRF2 received from the user respectively are coincident with each other. Only when they are both coincident with each other, is the recovered common KS transmitted to the user concerned. With this operation, the double check of the recovery authorization is carried out. Therefore, unauthorized recovery by a third party can be more efficiently suppressed.

In the second embodiment of the present invention, each of the terminals 10a to 10d transmits the index RCI of the recovery condition to the check unit 12a, 12b while the data si to si satisfying the recovery condition RC specified by the RCI concerned are contained in the recovery condition index RCI ([RCI|s1| . . . |si]r|[r]KRC2pub). With this operation, the challenge and response to check the recovery authorization is omitted. However, the present invention is not limited to the above mode, and the challenge and response may be carried out in the same manner as the first embodiment. In this case, the data s1 to si necessary to satisfy the recovery condition RC specified by the recovery condition index RCI are not required to be contained in KRF2.

Further, in the second embodiment of the present invention, the recovery condition index RCI of the recovery condition is obtained by extracting the data [RCI]KS from KRF1 and decrypting the data thus extracted with the common key KS in step 1114 shown in FIG. 5. Thereafter, in step 1115, it is checked whether the obtained recovery condition index RCI and the recovery condition index obtained from KRF2 in step 1106 are coincident with each other. However, the present invention is not limited to this mode.

For example, in step 1114 of FIG. 5, the data [RCI]KS are extracted from KRF1, the recovery condition index obtained from KRF2 in step 1106 is encrypted with the common key KS to generate the data [RCI]KS, and then in step 115 it is checked whether they are both coincident with each other. With this procedure, whether the recovery condition index RCI contained in KRF1 and the recovery condition index RCI contained in KRF2 are coincident with each other can be checked without recovering the recovery condition index RCI contained in KRF1. Therefore, the security can be further enhanced.

Further, in the second embodiment of the present invention, when the urgent recovery is carried out, that is, when the terminals 10a to 10d transmit KRF1, KRF2 to the check unit 12a, 12b, KRF2 is generated. However, the present invention is not limited to this mode.

For example, KRF2 may be generated simultaneously with generation of KRF1 and added to the encrypted message body. Alternatively, it may be separately stored in a storage medium.

Next, a modification of the second embodiment according to the present invention will be described. In this modification, the check of the key recovery authorization can be made among plural domains to which the format of the key recovery condition is not made common even when the key recovery condition is set in the format of another domain.

Figure 6:
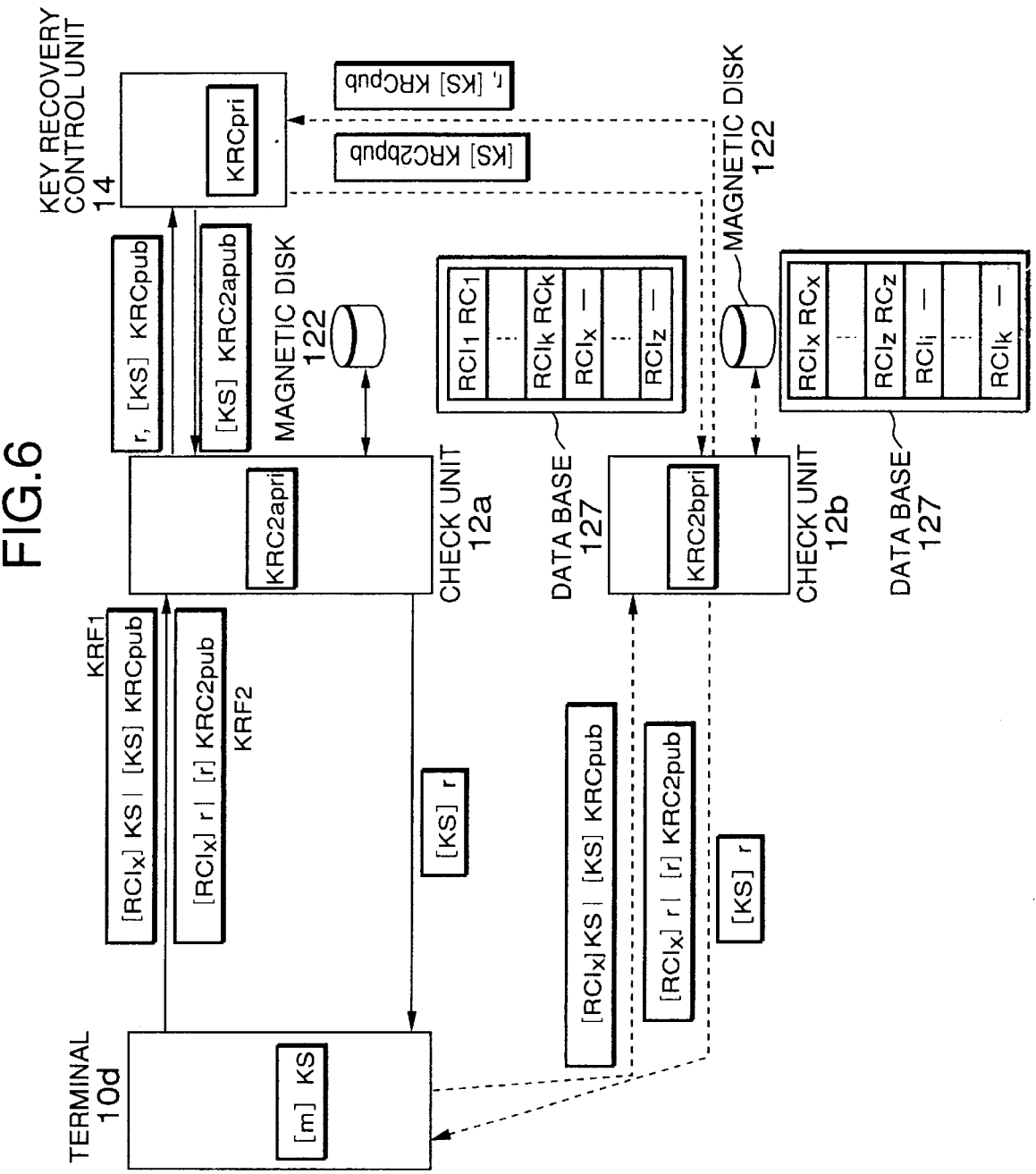
FIG. 6 is a diagram showing the data flow of the urgent recovery of a modification of the second embodiment of the present invention.
Figure 7:
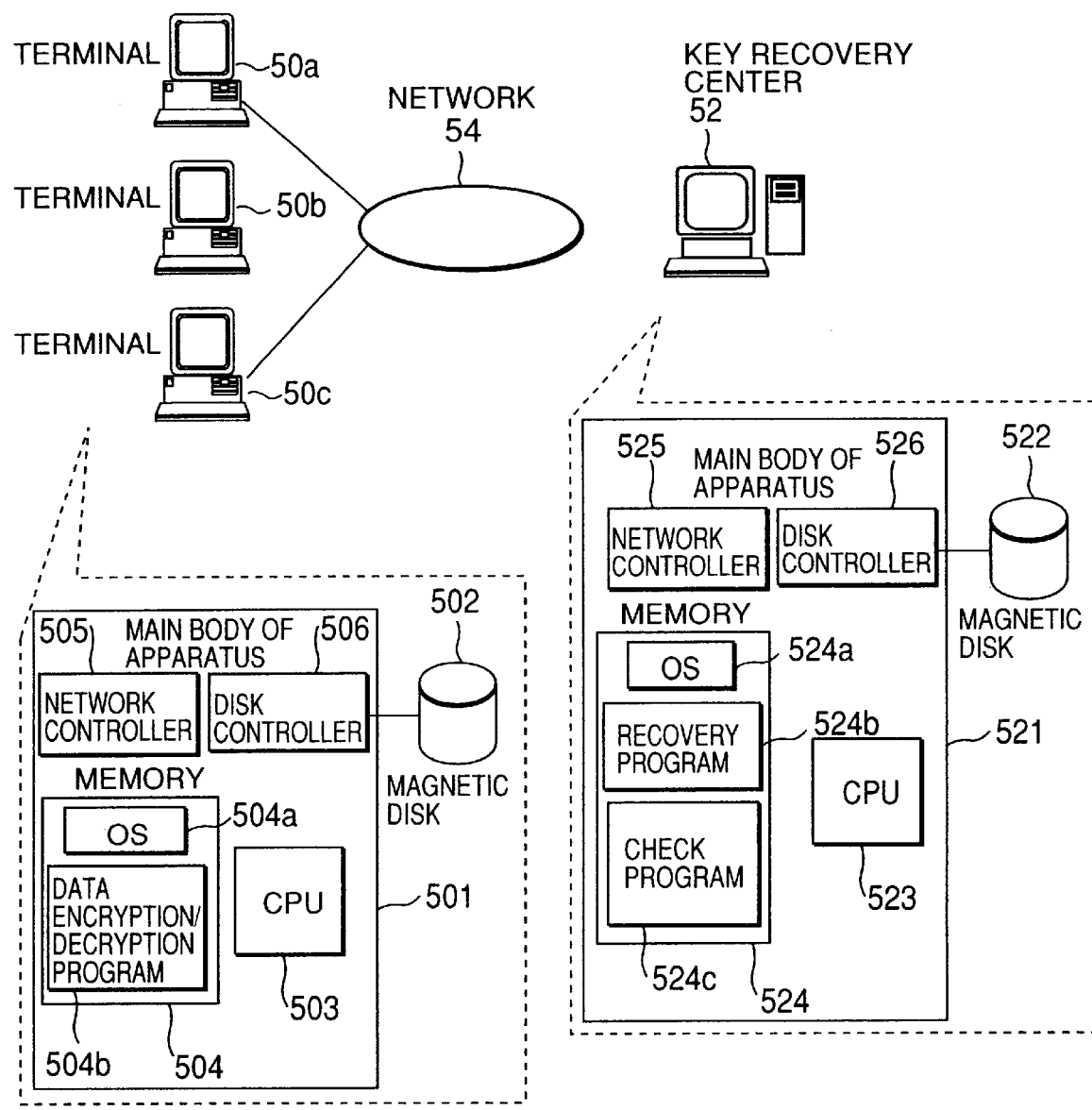
FIG. 7 is a diagram show a key recovery system to which a conventional KRF system is applied.
Figure 8:
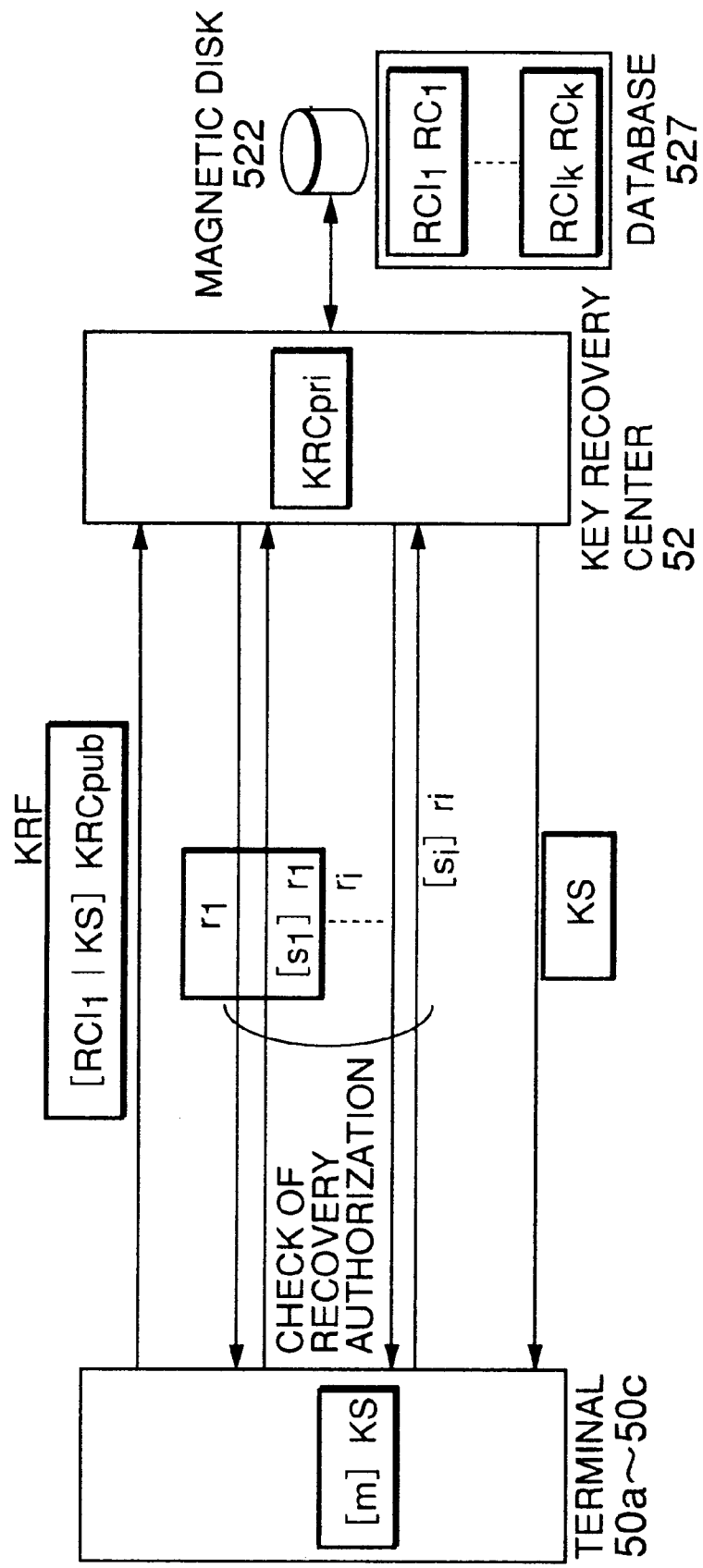
FIG. 8 is a diagram showing the data flow in the urgent recovery of the key recovery system using the conventional KRF system.

FIG. 6 shows the data flow in the urgent recovery of the modification of the second embodiment according to the present invention.

In this modification, KRF2 ([RCI]r|[r]KRC2pub) is prepared when the urgent recovery is carried out, and transmitted to the check unit 12a, 12b together with KRF1 ([RCI]KS|[KS]KRCpub) which are prepared in advance.

Further, in the magnetic disk 122 of the check unit 12a, 12b, the recovery condition indexes RCI of the recovery conditions RC of the users of all the terminals 10a to 10d which constitute the key recovery system are stored in the form of a data base. Even when the recovery condition RC corresponding to the recovery condition index RCI obtained in step 1106 cannot be detected, in step 1107 of FIG. 5, it is judged that the user has recovery authorization in step 1109 if the same data as the recovery condition index RCI concerned can be detected from the data base of the magnetic disc 122.

With this design, for example, when the terminal 10d is moved and then connected to the network 16a, the terminal 10d requests key recovery to the check unit 12a. In this case, even when the check unit 12a does not store the recovery condition RC of the user of the terminal 10d into the magnetic disk 122, the key can be recovered.

In FIG. 6, the recovery condition index of the recovery condition of the common key KS which is required to be recovered by the user of the terminal 10d is represented by RCIx. Further, it is assumed that the recovery condition RCx corresponding to the recovery condition index RCIx is stored in the data base of the magnetic disc 122 of the check unit 12b, but it is not stored in the data base of the magnetic disc 122 of the check unit 12a.

When the terminal 10d is connected to the check unit 12b through the network 16b, the recovery request of the common key KS is made to the check unit 12b as the data flow indicated by a dotted line in FIG. 6. In this case, since the recovery condition RCx corresponding to the recovery condition index RCIx is recorded in the data base of the magnetic disc 122 of the check unit 12b, the challenge and response for the recovery authorization check is carried out between the terminal 10d and the check unit 16b according to the recovery condition RCx.

On the other hand, when the terminal 10d is connected to the check unit 12a through the network 16a, as the data flow indicated by the solid line in FIG. 6, the recovery request of the common key KS is made to check unit 12a. The recovery condition index RCIx is recorded in the data base of the magnetic disc 122 of the check unit 12a, but the recovery condition RCx corresponding to the recovery condition index RCIx is not recorded in the data base. In this case, according to this modification, the check unit 12a omits the challenge and response, and checks whether the recovery condition index RCIx is recorded in the data base of the magnetic disc 122. If the recovery condition index RCIx is judged to be recorded, it is judged that the user of the terminal 10d has the recovery authorization, and the recovery of the common key KS is requested to the key recovery control unit 14.

As described above, in this modification, when the key recovery is performed through the check unit of another domain, the key recovery is carried out if the recovery condition index RCI of the recovery condition is registered in the same data format as the data base of the check unit concerned even when the recovery condition RC does not exist in the data base concerned. Accordingly, the key recovery authorization can be checked among plural domains to which the format of the key recovery condition is not made common even if the key recovery condition is set in the format of another domain. That is, the check units 12a and 12b can execute the check work of the key recovery authorization for each other, so that efficient operation of the overall key recovery system can be achieved.

Further, according to this modification, by providing to the recovery condition index non-C&R representing that the challenge and response for the recovery authorization is unnecessary to the recovery condition index RCI of the recovery condition, the check unit can be made to judge whether the challenge and response should be carried out or it is merely confirmed that the data coincident with the recovery condition index RCI are recorded in the data base. In this case, KRF1, KRF2 transmitted from the terminal to the check unit has the following data structure:

| | |
|---|---|
| KRF1 : [RCI \| non-C&R]KS | [KS]KRCpub |
| KRF2 : [RCI \| non-C&R]r | [r]KRC2pub |

The second embodiment according to the present invention has been described above.

As described above, according to the present invention, the problems of the key recovery system using the conventional KRF system can be overcome, and the efficient operation of the overall key recovery system can be achieved.

Specifically, the load imposed on the management of the key recovery key used in the urgent recovery can be reduced.

Further, by recovering a key after the check of the recovery authorization of the key concerned is carried out, the load of the manager of the key concerned can be reduced.

Still further, the check of the key recovery authorization can be carried out among plural domains to which the format of the key recovery condition is not made common even when the key recovery condition is set in the format of another domain.

What is claimed is:

1. A key recovery control unit in which an encrypted message obtained by encrypting a data key serving as a data encryption/decryption key with a system key serving as a data encryption key is decrypted by using a master key serving as a data decryption key in accordance with a user's request, thereby recovering the data key, comprising:

acquisition means for acquiring, from a suer, a first encrypted message obtained by encrypting a first data key with a first system key, and a second encrypted message obtained by encrypting a second data key with a second system key, which is added with data obtained by encrypting a key recovery field on a recovery condition of the first data key with the second data key;

first key recovery means for decrypting the second encrypted message acquired in said acquisition means by a master key which is paired with the second system key, thereby recovering the second data key, and decrypting the encrypted message of the key recovery field added to the second encrypted message by using the second data key, thereby recovering the key recovery field;

field authorization check means for checking, according to a recovery condition specified by the key recovery field recovered by said first key recovery means, whether the user supplying the first encrypted message and the second encrypted message has a recovery authorization of the first data key; and second key recovery means for decrypting the first encrypted message acquired in said acquisition means by using a master key paired with said first system key if it is judged in said fist authorization check means that the user has the recovery authorization, thereby recovering the first data keys wherein the data obtained by encrypting the key recovery field with the first data key is added to the first encrypted message, and said second key recovery means decrypts the first encrypted message obtained by said acquisition means with a master key paired with said first system key to recover the first data key if it is judged in said first authorization means that the user has the recovery authorization, and decrypts the encrypted message of the key recovery field added to the first encrypted message with the first data key to recover the key recovery field, and wherein said key recovery control unit further comprises second authorization check means for checking whether the key recovery field recovered in said first key recovery means is coincident with the key recovery field recovered in said second key recovery means, and means for supplying said first data key recovered by said second key recovery means to the user concerned only when it is judged that the key recovery field recovered by said first key recovery means is coincident with the key recovery field recovered by said second key recovery means.

2. The key recovery control unit as claimed in claim 1, wherein said key recovery control unit comprises:

a first device including said acquisition means, said first key recovery control means and said first authorization means; and a second device having said second key recovery means which is provided separately from said first device.

3. The key recovery control unit as claimed in claim 1, wherein the key recovery field is a recovery condition index representing that a user has a recovery authorization, and said key recovery unit further includes a storage device in which at least one recovery condition index and a recovery condition associated with the recovery condition index are stored, and wherein said first authorization check means searches the recovery condition index recovered by said first key recovering means from said storage device to extract the recovery condition associated with the recovery condition index concerned, and judges on the basis of the recovery condition whether a user supplying the first encrypted message and the second encrypted message has a recovery authorization for the first data key.

4. The key recovery control unit as claimed in claim 3, wherein when the recovery condition associated with the recovery condition index recovered by said first key recovery means is not stored in said storage device, said first authorization check means checks whether the recovery condition index itself is stored in said storage device, and judges on the basis of the check result whether the user supplying the first encrypted message and the second encrypted message has the recovery authorization for the first data key.

5. The key recovery control unit as claimed in claim 3, wherein when the recovery condition index recovered by said first key recovery means is added with information representing lack of necessity to check the recovery condition, said first authorization check means checks whether the recovery condition index itself is stored in said storage device, and judges on the basis of the check result whether the user supplying first encrypted message and the second encrypted message has the recovery authorization for the first data key.

6. A recording medium which has stored therein a key recovering program in which an encrypted message obtained by encrypting a data key serving as a data encryption/decryption key with a system key serving as a data encryption key is decrypted by using a master key serving as a data decryption key in accordance with a user's request, thereby recovering the data key, wherein said key recovering program makes an information processing device execute:

first processing for obtaining from a user a first encrypted message obtained by encrypting a first data key with a first system key, and a second encrypted message obtained by encrypting a second data key with a second system key, which is added with data obtained by encrypting a key recovery field on a recovery condition of the first data key with the second data key;

second processing for decrypting the second encrypted message obtained in said first processing with a master key paired with the second system key, thereby recovering the second data key, and decrypting the encrypted message of the key recovery field added with the second encrypted message by using the second data key, thereby recovering the key recovery field;

third processing for judging on the basis of the recovery condition specified by the key recovery field recovered in said second processing whether a user supplying the first encrypted message and the second encrypted message has a recovery authorization for the first data key; and fourth processing for decrypting the first encrypted message obtained in said first processing with a master key paired with the first system key when it is judged in said third processing that the user has the recovery authorization thereby recovering the first data key, wherein the data obtained by encrypting the key recovery field with the first data key is added to the first encrypted message, and said fourth processing decrypts the first encrypted message obtained by said first processing with a master key paired with said first system key to recover the first data key if it is judged in said third processing that the user has the recovery authorization, and decrypts the encrypted message of the key recovery field added to the first encrypted message with the first data key to recover the key recovery field, and wherein said key recovery program makes the information processing device further execute fifth processing for checking whether the key recovery field recovered in said second processing is coincident with the key recovery field recovered in said fourth processing, and sixth processing for supplying said first data key recovered by said fourth processing to the user concerned only when it is judged that the key recovery field recovered by said second processing is coincident with the key recovery field recovered by said fourth processing.

7. The recording medium as claimed in claim 6, wherein the key recovery field is a recovery condition index representing that the user has the recovery authorization, and said key recovery program is executed in an information processing device having a storage device in which at least one recovery condition index and a recovery condition associated with the recovery condition index are stored, and wherein said third processing searches the recovery condition index recovered in said second processing from said storage device to extract the recovery condition associated with the recovery condition index concerned, and judges on the basis of the recovery condition whether the user supplying the first encrypted message and the second encrypted message has the recovery authorization for the first data key.

8. The recording medium as claimed in claim 7, wherein when the recovery condition associated with the recovery condition index recovered in said first processing is not stored in said storage device, said third processing checks whether the recovery condition index is stored in said storage device and then judges, on the basis of the check result, whether the user supplying the first encrypted message and the second encrypted message has the recovery authorization for the first data key.

9. The recording medium as claimed in claim 7, wherein when the recovery condition index recovered in said second processing is added with information representing that check of a recovery condition is unnecessary, said third processing checks whether the recovery condition index is stored in said storage device, and judges on the basis of the check result whether the user supplying the first encrypted message and the second encrypted message has the recovery authorization for the first data key.

10. A key recovering method in which an encrypted message obtained by encrypting a data key serving as a data encryption/decryption key with a system key serving as a data encryption key is decrypted by using a master key serving as a data decryption key in accordance with a user's request, thereby receiving the data key, comprising.

a first step for obtaining from a user a first encrypted message obtained by encrypting a first data key with a first system key, and a second encrypted message obtained by encrypting a second data key with a second system key, which is added with data obtained by encryption key recovery field on a recovery condition of the first data key with the second data key;

a second step for decrypting the second encrypted message obtained in said first step with a master key paired with the second system key thereby recovering the second data key, ad decrypting the encrypted message of the key recovery field added with the second encrypted message by using the second data key, thereby recovering the key recovery field;

a third step for judging, on the basis of the recovery condition specified by the key recovery field recovered in said second step, whether a user supplying the fist encrypted message and the second encrypted message has a recovery authorization for the first data key; and a fourth step for decrypting the first encrypted message obtained in said first step with a master key paired with the first system key when it is judged in said third step that the user has the recovery authorization, thereby recovering the first data key, wherein the data obtained by encrypting the key recovery field with the first data key is added to the first encrypted message, and said fourth step decrypts the first encrypted message obtained by said first step with a master key paired with said first system key to recover the first data key if it is judged in said third step that the user has the recovery authorization, and decrypts the encrypted message of the key recovery field added to the first encrypted message with the first data key to recover the key recovery field, and wherein said key recovering method further comprises a fifth step for checking whether the key recovery field recovered in said second step is coincident with the key recovery field recovered in said fourth step, and a sixth step for supplying said first data key recovered by said fourth step to the user concerned only when it is judged that the key recovery field recovered by said second step is coincident with the key recovery field recovered by said fourth step.

* * * * *